United States Patent [19]
Blanchette et al.

[11] Patent Number: 6,094,429
[45] Date of Patent: Jul. 25, 2000

[54] METHOD FOR ACCESSING AND PROVIDING ACCESS TO A PACKET CHANNEL

[75] Inventors: Jeffrey J. Blanchette, Palatine; Timothy J. Wilson, Rolling Meadows; J. Chris Stanaway, Wheaton, all of Ill.

[73] Assignee: Motorola, Inc., Schaumburg, Ill.

[21] Appl. No.: 09/032,885

[22] Filed: Mar. 2, 1998

[51] Int. Cl.[7] ........................................ H04J 3/16
[52] U.S. Cl. ................................. 370/347; 370/337
[58] Field of Search ............................ 455/515, 38.3, 455/573, 574, 343; 370/348, 337, 321, 347, 322, 311, 314, 329, 280, 294, 470

[56] References Cited

U.S. PATENT DOCUMENTS

| | | | |
|---|---|---|---|
| 5,509,015 | 4/1996 | Tiedemann, Jr. et al. | 370/311 |
| 5,598,418 | 1/1997 | Crisler et al. | 370/348 |
| 5,604,744 | 2/1997 | Andersson et al. | 370/347 |
| 5,629,940 | 5/1997 | Gaskill | 370/311 |
| 5,640,395 | 6/1997 | Hamalainen | 370/322 |
| 5,729,541 | 3/1998 | Hamalainen et al. | 370/337 |
| 5,790,551 | 8/1998 | Chan | 370/458 |

*Primary Examiner*—Douglas W. Olms
*Assistant Examiner*—Ken Vanderpuye
*Attorney, Agent, or Firm*—Scott M. Garrett

[57] ABSTRACT

A communications system (100) has a TDMA signal (110) accessed by one or more mobile stations (104). The TDMA signal carries both circuit switched and packet data service. A packet channel is defined within a packet data frame (208) by assigning time slots not used by other services during the packet data frame to the packet channel. A packet data seed channel (204) is used to anchor the packet channel and steer a mobile station to the packet channel. In the packet data seed channel a dynamic allocation protocol (DCAP) slot (206) appears and carries the packet channel slot assignments for the next occurring packet data frame.

6 Claims, 5 Drawing Sheets

METHOD FOR ACCESSING AND PROVIDING ACCESS TO A PACKET CHANNEL

TECHNICAL FIELD

The invention relates in general to TDMA communication systems providing data service, and more particularly to methods of accessing packet data service.

BACKGROUND OF THE INVENTION

A majority of current communication networks, such as digital cellular, provide data and voice services based on circuit switched technology. However, the utilization of transmission resources in circuit switching is suboptimal because the transmission connection is maintained throughout the contact, without regard as to whether information is being transmitted or not at any given moment. Transmission resources are shared by multiple users, which means the reservation of a circuit switched connection for a single subscriber to engage in data service unnecessarily ties up transmission resources that could otherwise be shared. The transmission resources could be shared by using packet data, where data comes in packets at irregular intervals, and as such, there are inactive periods where no data for a particular receiver is being transmitted. Thus, sharing the resources takes advantage of these periods of inactivity in one connection to provide service in other connections.

However, during peak periods of service, a single logical channel devoted to packet data, shared by many users, will result in an unacceptably slow connection for each subscriber. The prior art has addressed this by describing systems in which multiple adjacent logical channels are used to provide packet data service. While the enjoining of adjacent channels clearly provides more bandwidth, it has the disadvantage of reducing the number of circuit switched calls that can be made in the particular service cell. In addition, using adjacent channel is also unnecessarily inflexible, and does not take into consideration the fact that an adjacent channel may be in use by other services, and thus not available for use in transmitting packet data.

Furthermore, present wireless data services are implemented in a way that results in the subscriber unit monitoring the data channel continuously. When data is present in the data channel, monitoring is necessary, but frequently there are times when the system is waiting for data from a data source, and thus is not transmitting any data to the subscriber, and thus monitoring results in the mobile station unnecessarily using precious battery power. In solving this problem, the use of a dynamic data channel has been contemplated, such as that described in U.S. Pat. No. 5,598,417 to Crisler et al. (Crisler). In Crisler there is taught a method of dynamically configuring a data channel. However, Crisler fails to address the problem of how a mobile station accesses the data channel. Therefore there is a need, in a wireless communication system having a dynamic data channel for a method of accessing the dynamic data channel.

DETAILED DESCRIPTION OF THE PREFERRED EMBODIMENT

Figure 1:
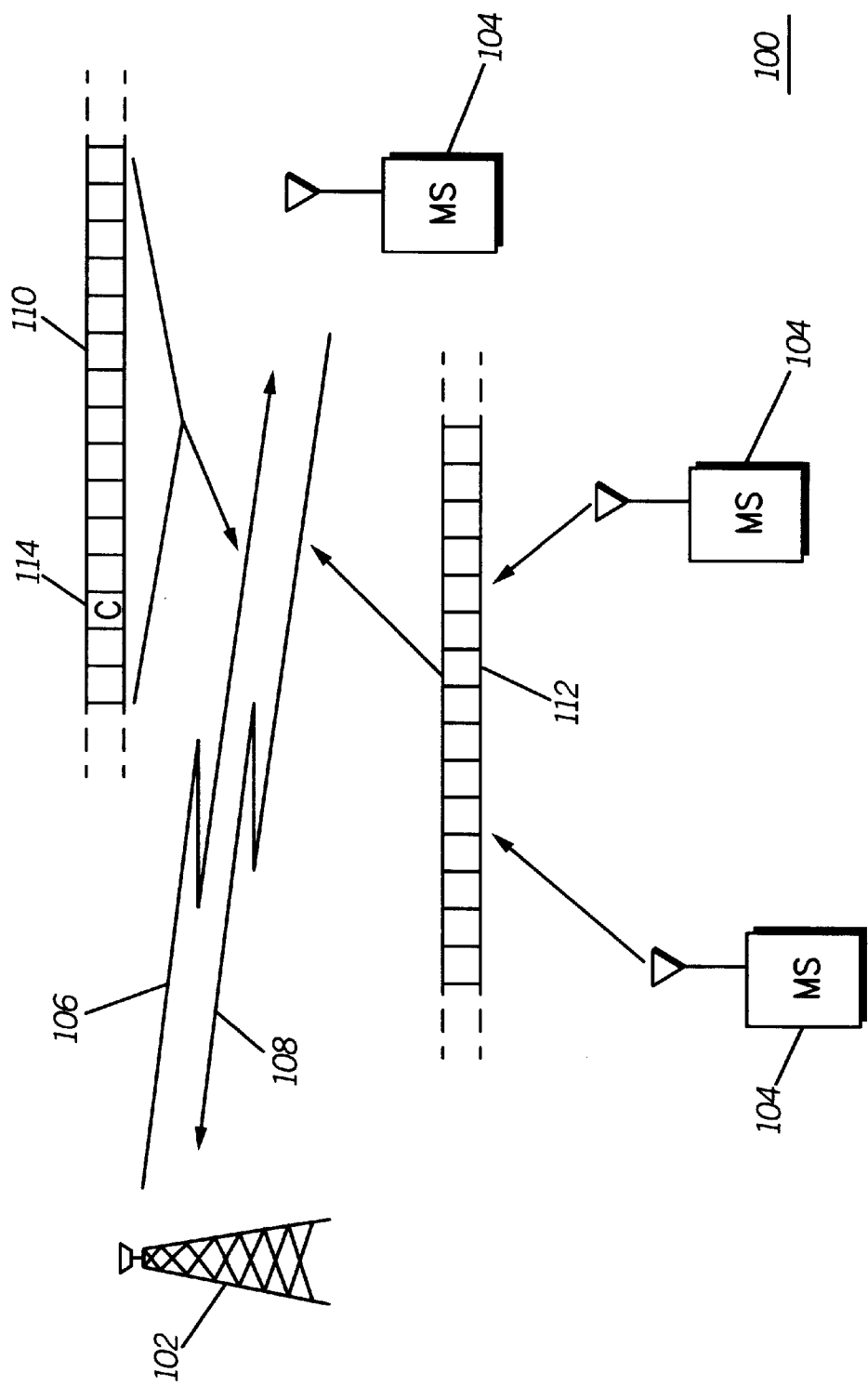
FIG. 1 shows a system diagram for a wireless TDMA communications system.

While the specification concludes with claims defining the features of the invention that are regarded as novel, it is believed that the invention will be better understood from a consideration of the following description in conjunction with the drawing figures, in which like reference numerals are carried forward. For the following discussion it should be assumed that the system being considered is a time divisioned one, such as time division multiple access (TDMA), as is well known in the art.

The invention addresses the shortcomings of the prior art by providing a packet data seed channel mechanism for accessing a dynamic packet channel. The packet data seed channel carries a dynamic channel allocation protocol (DCAP) slot that contains information as to which time slots of the next occurring packet data frame comprise the packet channel. That is, which time slots have been assigned to the packet channel, and will therefore carry packet data. In order to access the packet channel, a mobile station first requests a packet data seed channel information from the serving base station. The seed channel information is transmitted to a mobile station in a control message, and thus eliminates the need for the mobile station to monitor every time slot to acquire the data channel. The packet channel can be comprised of any number and combination of time slots within a given packet data frame, so long as the time slots are available and not in use by circuit switched services such as circuit data or voice traffic. In announcing which time slots comprise the packet channel, the mobile station receiving the data does not have to monitor each time slot, only those announced in the DCAP slot. The DCAP slot can also announce which upcoming time slot marks the beginning of the next occurring packet data frame.

Referring now to FIG. 1, there is shown therein a system diagram for a time division multiple access (TDMA) wireless communication system 100 for use with the invention. The system comprises at least one transmitter, such as a base transceiver site or base station 102 and at least one receiver, such as a mobile station 104. The base station comprises radio equipment for establishing a serving cell in its local vicinity, and is operably coupled to a communications center, as is known in the art. A variety of circuit switched communication services may be supported by the base station, such as, for example, telephone interconnect and dispatch radio. The base station also provides packet data service in addition to circuit switched services. The base station transmits information to a mobile station according to an air interface on a first radio frequency 106. A second radio frequency 108 is used for a mobile station to transmit information to the base station. According to the air interface, the first radio frequency is time divisioned into outbound time slots 110, and the second radio frequency is time divisioned into inbound time slots 112, as is well practiced in the art. The time slots are organized into frames, and each time slot is numbered.

Figure 2:
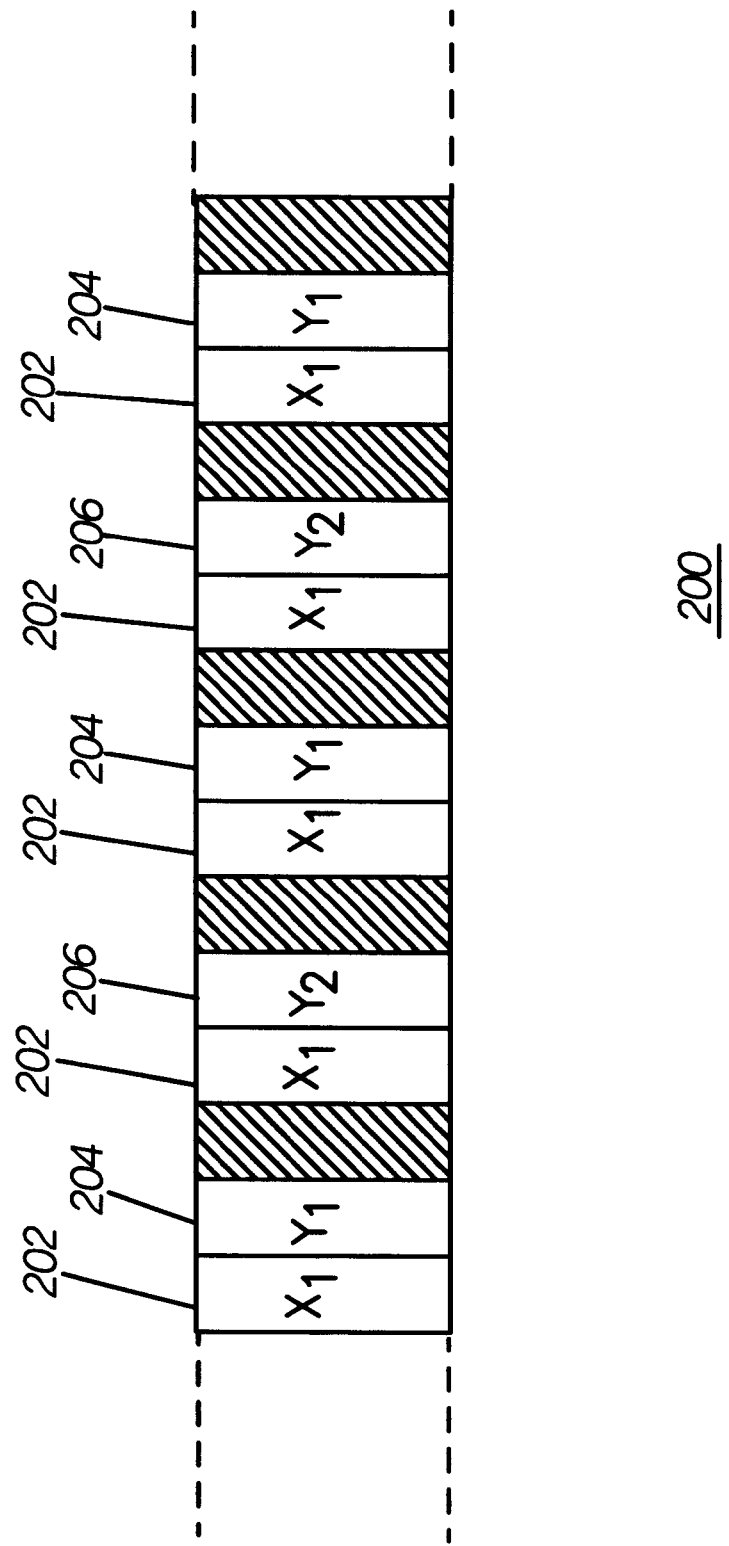
FIG. 2 shows a TDMA signal having channels at various interleaves in accordance with the invention.

Referring now to FIG. 2, which shows a TDMA signal 200 having channels at various interleaves in accordance with the invention. A logical channel can be defined by an offset and an interleave within a TDMA signal transmitted in a particular radio frequency band. The interleave determines how often a time slot assigned to the logical channel occurs within the frame. An interleave-n channel uses a time slot that occurs once in every n consecutive time slots, and in the same position in those n consecutive time slots. For example, an interleave-3 channel 202 designated $X_1$ uses a time slot that occurs once in every three consecutive time slots. In other words, every third time slot from the first occurring time slot of the channel. The two time slots between successive $X_1$ time slots can be assigned to other channels, including channels having a different interleave, such as a first interleave-6 channel 204 designated $Y_1$, and a second interleave-6 channel 206 designated $Y_2$. The remaining time slots (shaded) may be assigned to another interleave-3 channel, two interleave-6 channels, or four interleave-12 channels, or to a packet channel.

The offset indicates which of the consecutive n time slots is the particular time slot assigned to the channel, and referenced to the first occurring time slot in the frame. For example, a logical channel having an interleave of n=6 and an offset of 3 would use the 3rd, 9th, 15th, and 21st time slots, and so on, of the frame, assuming the channel was assigned during the complete duration of the frame. In implementation, the mobile station determines the present time slot number in a conventional manner, then performs an integer division operation by dividing the present time slot number by the interleave, and obtaining the remainder. The remainder is the offset of the present time slot for the particular interleave. In general, the number of time slots in a frame (the frame size) is the minimum number of time slots that is divisible by all of the various interleave levels. For example, in an embodiment having interleave-3, 6, 12, and 24 channels, the frame size would be 24 time slots since 24 is the least common multiple of 3, 6, 12, and 24. Additionally, a frame size of 24 could also support interleave-2, interleave-4, and interleave-8 channels if desired.

In order for a receiver to access a particular logical channel, the receiver reads all of the time slots at the appropriate interleave and offset over successive frames. For circuit switched services, a mobile station is assigned to a logical channel, and transmits and/or receives information in each time slot that occurs at the assigned interleave and offset during the communications session. At regular intervals, a control channel 114 occurs, where control information is transmitted. The control channel in the preferred embodiment alternates between a common control channel (CCCH) and a broadcast control channel (BCCH). Many wireless communication systems employ this scheme, such as, for example, systems in accordance with the Global Specification for Mobile communications (GSM).

Figure 3:
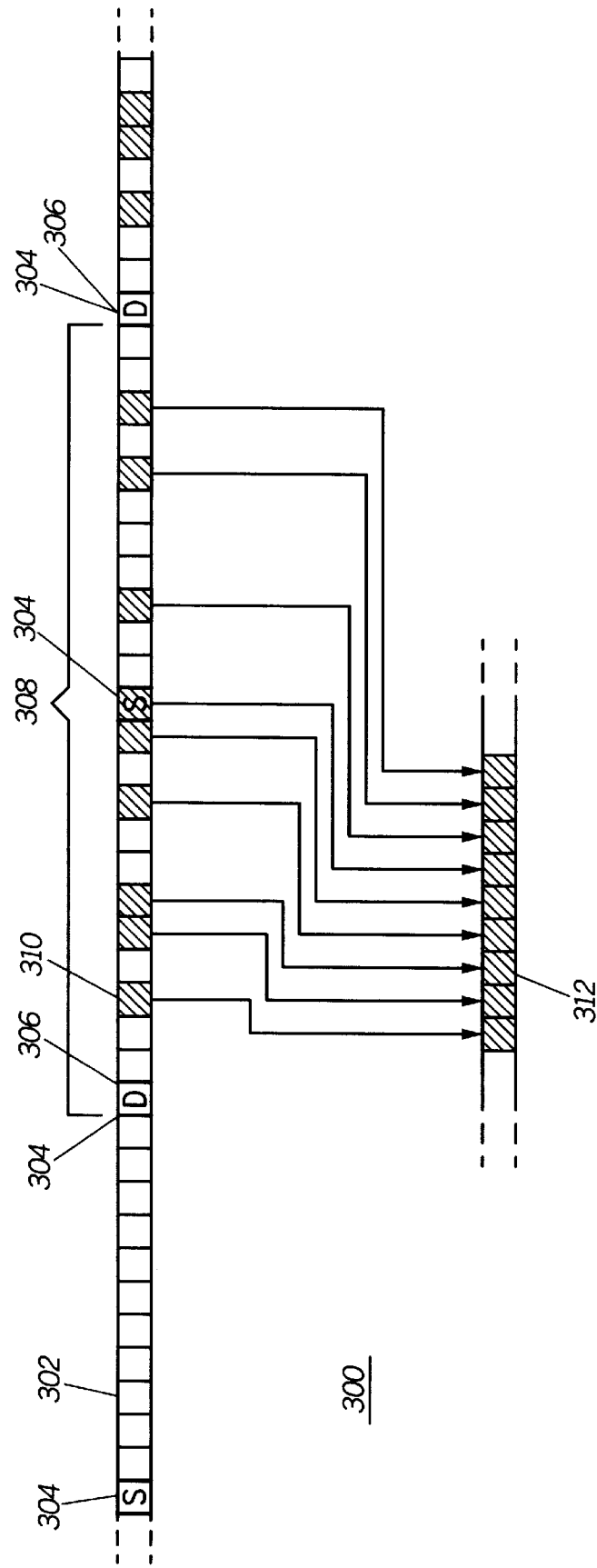
FIG. 3 shows a diagram of a TDMA signal for providing a packet channel in accordance with the invention.

Referring now to FIG. 3, there is shown a diagram of a time division multiple access signal 300 for providing a packet channel in accordance with the invention. The TDMA signal is comprised of a series of time slots, such as time slot 302, which are organized into frames. As described hereinabove, logical channels are defined by an interleave indicating how often a time slot for the channel occurs in the sequence of TDMA time slots. In the system employing a preferred embodiment of the invention there are pools of interleave-3, interleave-6, and interleave-12 channels, among others, available for use in providing various services. In providing packet data service according to the present invention, the system creates a packet channel out of those time slots not presently in use for providing other services over a packet data frame 308. In establishing the packet channel, the system first determines which time slots in the packet data frame will be in use by other services, and then assigns the remaining time slots to the packet channel. For example, in the packet data frame 308 of twenty four time slots, the hatched time slots, such as time slot 310, represent time slots assigned to the packet channel. All other time slots are assigned to channels for other services. The transmitting equipment places packet data in these time slots, and the receiving equipment reads the packet data from those time slots to form a packet stream 312. What is shown in FIG. 3 may represent either packet data being transmitted from the base station to a mobile station, or vice versa since there is correspondence between the outbound and inbound time slot assignments, with the exception that certain outbound time slots carry control and system data. The inbound time slots corresponding to these outbound control and system data time slots can be used by mobile station in any manner deemed appropriate by the system designers.

For the case where a mobile station is accessing the outbound signal from the base station, the mobile station, in order to locate the time slots of the packet channel, must read information in a control channel, such as a common control channel (CCCH), and obtain both an interleave and an offset defining a packet data seed channel 304. That is, the mobile station obtains the packet data seed channel information from the control channel, then begins monitoring the packet data seed channel by reading each time slot at the interleave and offset received in the packet data seed channel information message from the base station over the control channel. The mobile station then monitors the packet data seed channel defined by the interleave and offset specified in the packet data seed channel information until a dynamic allocation protocol (DCAP) slot 306 occurs in the packet data seed channel.

The packet seed channel 304 can have any interleave available in the system, and may be configurable by a system operator. However, the choice of interleave can be used to set the minimum data rate of the packet channel. For example, in a system having a packet data frame size of 24 slots, a seed channel of interleave-3 will occupy 8 time slots of the 24. Of those 8 time slots, one will be used as a DCAP slot 306, leaving at least 7 time slots predisposed to the packet channel for transmitting packet data. The other time slots of the packet data frame may be used for other services, or may also be assigned to the packet channel, depending on system traffic. The maximum interleave number of the packet seed channel is half the packet data frame size, so that at least two time slots of the packet data frame are predisposed to the packet channel, and one will carry packet data, the other will carry the DCAP information.

The DCAP slot 306 is used to inform the mobile station which time slots of the next packet data frame comprise the packet channel. Information transmitted in the DCAP time slot will identify the DCAP slot as such. The information transmitted during the DCAP time slot comprises a bitmap of all of the time slots of the next packet data frame, and indicates which of those time slots are assigned to the packet channel. The DCAP slot defines the beginning of the next packet data frame by specifying which upcoming time slot will begin the next packet data frame, and will occur shortly before the beginning of the next packet data frame to give the mobile station(s) time to acquire the time slot assignment. In the preferred embodiment, the DCAP slot occurs every 24th time slot. Thus, the step of assigning, in the preferred embodiment, comprises determining an assignment for each of the 24 time slots of the next packet data frame, then assigning those not used for other services to the packet channel. The time slot assignment information transmitted in the DCAP slot is only valid until the next DCAP slot.

Figure 4:
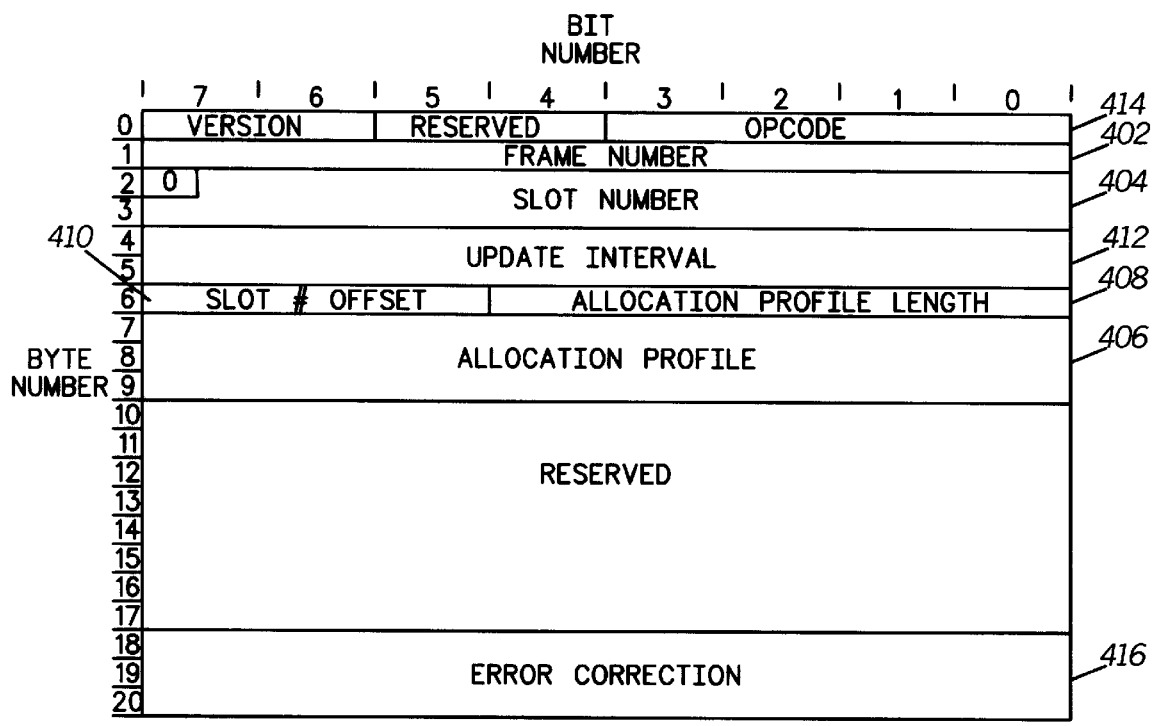
FIG. 4 shows a possible format for the information transmitted in a DCAP slot in accordance with the invention.

Referring now to FIG. 4, there is shown a possible slot format 400 for the information transmitted in a DCAP slot in accordance with the invention. The DCAP information comprises a current frame number 402 and a time slot number 404 which are included to provide synchronization for the receiving mobile station(s). A channel definition field 406 provides an allocation profile of the packet channel for the next occurring packet data frame, and is included to inform the receiving mobile station as to which time slots of the next packet data frame contain packet data. In the preferred embodiment the channel definition field is a bitmap definition having as many bits as there are time slots in the packet data frame. Each bit corresponds to a time slot, and is set to a binary 1 if the particular time slot is assigned to the packet channel, and a binary 0 if the time slot is not assigned to the packet channel. An allocation profile length 408 may be included to indicate the length of the repeating pattern of allocated time slots, which is typically one packet data frame. In front of the allocation profile length is a 3 bit wide slot number offset field 410 that may be used, for example, to define the beginning of the next occurring packet data frame. The value of the slot number offset field is added to the slot number 404 in the mobile station, the result being the slot number of the first time slot of the next occurring packet data frame. An update interval field 412 is included, and indicates a unit of time, as a number of overall or data only time slots, until the next DCAP slot occurs. Finally, the DCAP slot includes such control fields 414, 416 as necessary to properly decode the DCAP slot information.

In practicing the invention, preference is given to circuit switched services over packet data service. As such, the time slots used to make up the packet channel will vary as circuit switched connections are established and dropped. If all the time slots in the outbound signal are assigned to circuit switched calls, then, in the preferred embodiment, the packet channel will be closed. However, as soon as at least one of the time slots in a given packet data frame is released from a circuit switched connection, a packet channel can be opened by assigning the freed time slot(s) to the packet channel. Accordingly, the bandwidth of the packet channel will depend on voice and circuit switched connection traffic in the cell serviced by the base station. It is contemplated, however, that a minimum number of logical channels may be reserved so that a packet channel of a minimum bandwidth is always available, and additional bandwidth is added or subtracted as logical channels are released or assigned to circuit switched connections. Thus, with each packet data frame, the base station performs the task of updating the definition of the packet channel in response to a change in an assignment of the plurality of logical channels to the circuit switched service, thus making the packet channel very dynamic. In this regard, the packet channel "works around" the other channels assigned to circuit switched services.

Figure 5:
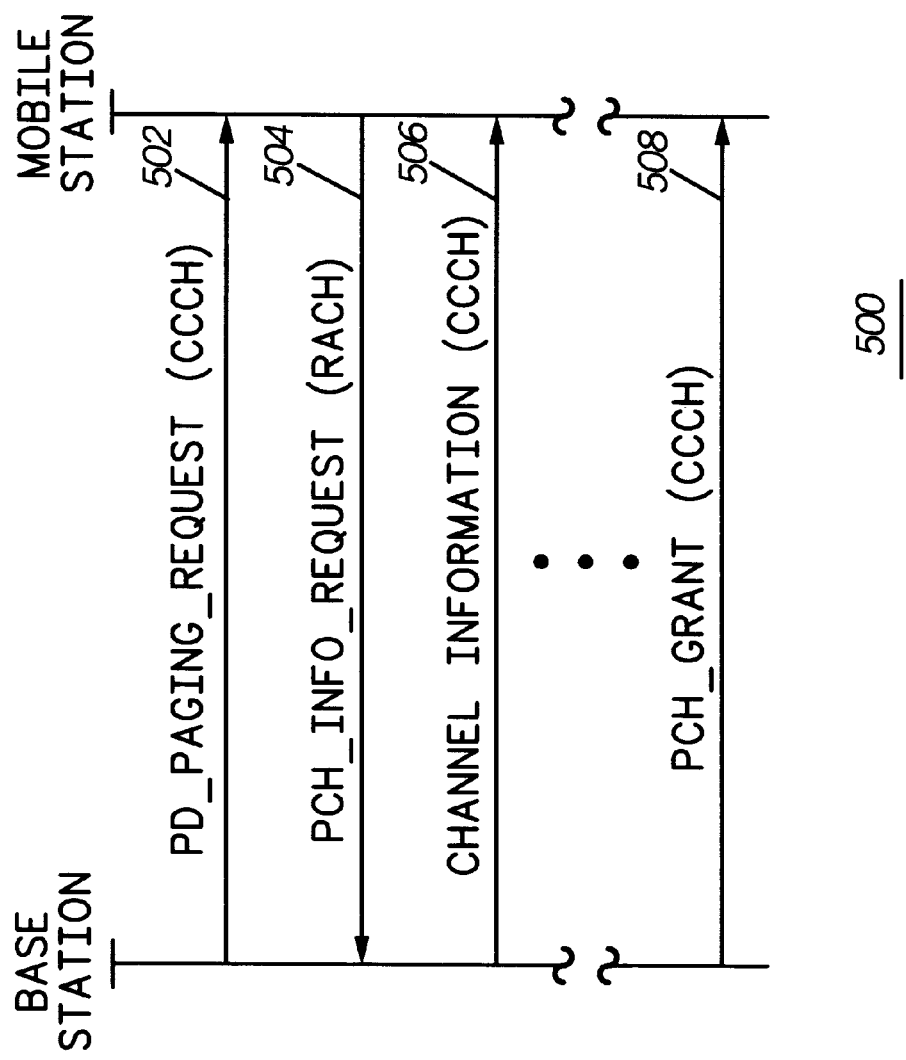
FIG. 5 shows a signaling diagram in accordance with the invention.

A method by which the outbound packet channel may be accessed by a mobile station comprises several steps, as illustrated in FIG. 5. Referring now to FIG. 5, there is shown a signaling diagram 500 in accordance with the invention. When the base station has packet data for a given mobile station, and is ready to transmit that packet data, the base station first pages the mobile station by sending the packet data paging request message PD_PAGING_REQUEST 502 over, for example, a common control channel (CCCH). Transmitting the PD_PAGING_REQUEST message is performed so that the base station can ensure that the mobile station is available and ready to receive data. The mobile station responds to the paging by sending a PCH_INFO_REQUEST 504 on, for example, a random access channel (RACH). The PCH_INFO_REQUEST message informs the base station that the mobile station is ready. The PCH_INFO_REQUEST message may also be used to initiate a packet data session by the mobile station, without responding to a PD_PAGING_REQUEST message. The base station responds to the PCH_INFO_REQUEST message by transmitting a CHANNEL INFORMATION message 506, containing the packet data seed channel information, including the offset and interleave of the packet data seed channel, to the mobile station, in response the mobile station responding to the paging, or in response to a mobile station initiating a packet data session. The mobile station obtains the offset and interleave of the packet data seed channel by reading the packet data seed channel information sent over the control channel. The mobile station then begins monitoring the logical channel defined by the interleave and offset received in the packet data seed channel information to find a dynamic channel allocation protocol (DCAP) slot occurring in the packet data seed channel. The DCAP slot defines the beginning of the next occurring packet data frame, and provides a bitmap definition specifying at least one additional time slot in the next occurring packet data frame for carrying packet data, thus providing a definition of the packet channel for the next occurring packet data frame. The mobile station reads the bitmap definition transmitted during the DCAP slot that defines the packet channel in the next packet data frame, and then receives or reads the data in each time slot assigned to the packet channel, as specified in the bitmap definition, to receive the packet data. The mobile station can also get the packet data seed channel offset and interleave in a PCH_GRANT message 508, which is also sent over a CCCH. The PCH_GRANT message can occur when, for example, the packet channel has been closed because all time slots have been in use by voice or circuit switched services, and at least one of the time slots has become available.

There are several benefits in providing the packet channel and the means for accessing it in accordance with the invention. For one, system resources are not rigidly allocated to packet data, and instead, take advantage of resources as they become available. The use of a packet data seed channel facilitates the use of a dynamic data channel by making the task of locating the data channel much simpler for the mobile station over previously described methods. Another benefit is that if the mobile station temporarily loses the signal from the base station, the packet data seed channel allows the mobile to quickly get back to the packet channel.

Dynamic configuring of the packet channel maintains the bandwidth at a maximum level without compromising the availability of system resources for circuit switched services. By providing a packet data seed channel, and a DCAP slot in the seed channel, mobile stations can easily access and track the composition of the packet data seed channel on a frame by frame basis. The use of a packet data seed channel permits the mobile station to quickly find the data channel without unnecessarily monitoring each outbound time slot, and subsequently to receive or read only the information in the logical channels assigned to the packet channel, which results in a method to reduce battery current drain. The mobile station accomplishes this battery savings by acquiring the packet data seed channel information, reading the DCAP slot in the packet seed channel, then activating its receiver only during the occurrences of those time slots assigned to the packet channel in the current packet data frame.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of accessing a packet channel, by a receiver, in a TDMA signal between a transmitter and the receiver, the TDMA signal having a plurality of interleaves. the method comprising the steps of:

reading a packet seed channel information from a control channel, the packet seed channel information specifying a packet data seed channel in the TDMA signal, including reading an interleave and an offset of the packet seed channel;

monitoring the packet data seed channel until a dynamic channel allocation protocol (DCAP) slot occurs in the packet data seed channel, the DCAP slot defining a beginning of a next occurring packet data frame and a bitmap definition of the packet channel in the next occurring packet data frame, performed after performing the step of reading the packet seed channel information;

reading the bitmap definition of the packet channel from the DCAP slot, performed after performing the step of monitoring; and reading the packet channel, performed after the step of reading the bitmap definition of the packet channel.

2. A method of providing access to a packet channel, in a wireless communication system, between a base station and a mobile station, the method comprising the steps of:

providing a plurality of interleave levels in a TDMA signal between the base station and the mobile station;

requesting a packet data seed channel information, performed by the mobile station;

transmitting the packet data seed channel information to the mobile station from the base station in response to the requesting, and wherein the packet data seed channel information comprises an interleave and an offset of a packet data seed channel;

receiving the packet data seed channel information at the mobile station;

monitoring the packet data seed channel, performed by the mobile station;

transmitting a dynamic channel allocation protocol (DCAP) slot in the packet data seed channel, performed by the base station, the DCAP slot defining the beginning of a next occurring packet data frame and a definition of the packet channel for the next occurring packet data frame, the definition of the packet channel specifying which time slots of the next occurring packet data frame are assigned to the packet channel; and reading the DCAP slot in the packet data seed channel, performed by the mobile station, to acquire the definition of the packet channel.

3. A method of providing access to a packet channel as defined in claim 2, wherein the step of transmitting a DCAP slot comprises transmitting a DCAP slot at regular intervals.

4. A method of providing access to a packet channel as defined in claim 2, wherein the step of transmitting a DCAP slot comprises transmitting a DCAP slot in response to a change in the definition of the packet channel.

5. A method of providing access to a packet channel as defined in claim 2, wherein the definition of a the packet channel is a bitmap definition of the packet channel.

6. A method of providing access to a packet channel in a TDMA signal in a wireless communication system, between a base station and a mobile station, the method comprising the steps of:

paging the mobile station over a control channel, performed by the base station;

responding to the paging over a random access channel, and requesting a packet data seed channel information, performed by the mobile station in response to the paging;

transmitting the packet data seed channel information over the control channel to the mobile station in response to the responding to the paging, including transmitting an interleave and an offset of the packet seed channel, the interleave of the packet seed channel being the least common multiple of a plurality of interleaves in the TDMA signal; and monitoring the packet data seed channel, performed by the mobile station after receiving the packed data seed channel information until an occurrence of a dynamic channel allocation protocol (DCAP) slot, the DCAP slot containing a definition of the packet channel for a next occurring packet data frame.

* * * * *